United States Patent
l'Anson

(10) Patent No.: US 8,817,787 B2
(45) Date of Patent: Aug. 26, 2014

(54) DATA PROCESSING METHOD AND SYSTEM

(75) Inventor: Colin I'Anson, Ottery St Mary (GB)

(73) Assignee: Hewlett-Packard Development Company, L.P., Houston, TX (US)

(*) Notice: Subject to any disclaimer, the term of this patent is extended or adjusted under 35 U.S.C. 154(b) by 1216 days.

(21) Appl. No.: 12/361,204

(22) Filed: Jan. 28, 2009

(65) Prior Publication Data

US 2009/0190576 A1  Jul. 30, 2009

(30) Foreign Application Priority Data

Jan. 28, 2008 (GB) .................................. 0801480.5

(51) Int. Cl.
H04L 12/26 (2006.01)
H04M 11/00 (2006.01)
H04L 29/06 (2006.01)
H04M 3/22 (2006.01)
H04M 7/00 (2006.01)

(52) U.S. Cl.
CPC ............ H04L 63/14 (2013.01); H04M 3/2281 (2013.01); H04L 63/30 (2013.01); H04M 7/0078 (2013.01); H04L 65/1069 (2013.01)
USPC ........ 370/392; 370/355; 370/401; 379/93.14; 379/100.09; 379/220.01

(58) Field of Classification Search
CPC ..................... H04L 29/06231; H04L 29/06278
USPC ................. 370/351, 352, 355, 389, 392, 401; 379/93.09, 93.14, 100.09, 220.01
See application file for complete search history.

(56) References Cited

U.S. PATENT DOCUMENTS

| | | | |
|---|---|---|---|
| 2004/0165709 A1 | 8/2004 | Pence et al. | |
| 2006/0114932 A1* | 6/2006 | Cai et al. | 370/466 |
| 2006/0203749 A1* | 9/2006 | Tseng | 370/260 |
| 2007/0019619 A1* | 1/2007 | Foster et al. | 370/352 |
| 2007/0140267 A1* | 6/2007 | Yang | 370/401 |
| 2007/0201484 A1* | 8/2007 | Kenrick et al. | 370/395.5 |
| 2007/0226361 A1* | 9/2007 | Shaikh et al. | 709/230 |
| 2007/0291106 A1* | 12/2007 | Kenrick et al. | 348/14.01 |
| 2008/0037518 A1* | 2/2008 | Kumarasamy et al. | 370/352 |
| 2008/0049924 A1* | 2/2008 | Gallant et al. | 379/220.01 |
| 2008/0080481 A1* | 4/2008 | Calahan et al. | 370/352 |
| 2009/0141883 A1* | 6/2009 | Bastien | 379/213.01 |
| 2009/0190576 A1* | 7/2009 | I'Anson | 370/352 |

FOREIGN PATENT DOCUMENTS

| | | |
|---|---|---|
| EP | 1592215 A1 | 11/2005 |
| WO | WO 2004/006553 A1 | 1/2004 |
| WO | WO 2004/091250 A1 | 10/2004 |

* cited by examiner

Primary Examiner — Benjamin H Elliott, IV

(57) ABSTRACT

A method of managing an IP call between a calling party and a called party, the method comprising receiving, at a gateway, a request to set up the call from the calling party; determining, from the request, a requirement to route the call through an interceptor; forwarding the request from the gateway to the interceptor; setting up an IP call between the interceptor and the called party; setting up an IP call between the interceptor and the calling party; and operating the interceptor as a back-to-back user agent (B2BUA) between the calling party and the called party.

18 Claims, 5 Drawing Sheets

DATA PROCESSING METHOD AND SYSTEM

RELATED APPLICATIONS

This application claims priority to Great Britain Patent Application Serial No. 0801480.5, filed Jan. 28, 2008, and entitled "DATA PROCESSING METHOD AND SYSTEM," which is commonly assigned.

BACKGROUND

Traditional circuit switched telephone networks offer the ability for two parties to engage in a voice conversation. Service providers of such telephone networks may have a legal requirement to provide the ability to intercept calls (i.e. voice conversations). For example, intercepting a call involves recording the voice conversation of a call in a manner that is transparent or barely noticeable to the parties involved in the conversation.

The growth of internet-protocol (IP) based networks has led to the development of Voice over IP (VoIP). VoIP is a technology that is used for voice conversations between parties over IP networks.

It is an object of embodiments of the invention to at least mitigate one or more of the problems of the prior art.

BRIEF DESCRIPTION OF THE DRAWINGS

Embodiments of the invention will now be described by way of example only, with reference to the accompanying figures, in which.

DETAILED DESCRIPTION

Embodiments of the invention enable an IP call to be intercepted and recorded, even when the calling party, called party and the party managing the network are located within different IP networks.

An IP call is a call that is conducted over an IP network. The IP call may comprise, for example, a Voice over IP (VoIP) call, or may alternatively comprise any other call over an IP network, such as, for example, a video over IP call. The calling party is the party that initiates the call, that is, the party that sends an invite intended to be delivered to the called party. The calling party and/or called party are seen as user agents (UAs) within the IP network.

Figure 1:
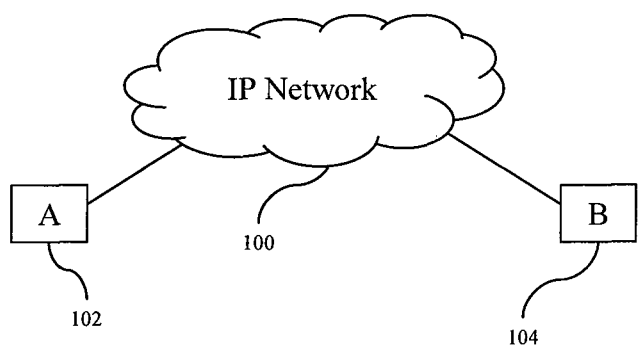
FIG. 1 shows an example of an IP network.

FIG. 1 shows an example of an IP network 100. The IP network 100 allows a first party A 102 and a second party B 104 to engage in IP calls with each other. For example, the first party A 102 may be the calling party and call the second party B 104, which is the called party. Alternatively, the second party B 104 may be the calling party and call the first party A 102, which is the called party. The IP network 100 may comprise one or more IP-based networks, that is, networks that are capable of transmitting IP-based traffic. Thus, for example, the IP network may comprise one or more physical layers (LAN, WLAN, cellular/mobile and the like) that are capable of transmitting IP-based traffic. The IP network 100 may comprise or include the internet.

Figure 2:
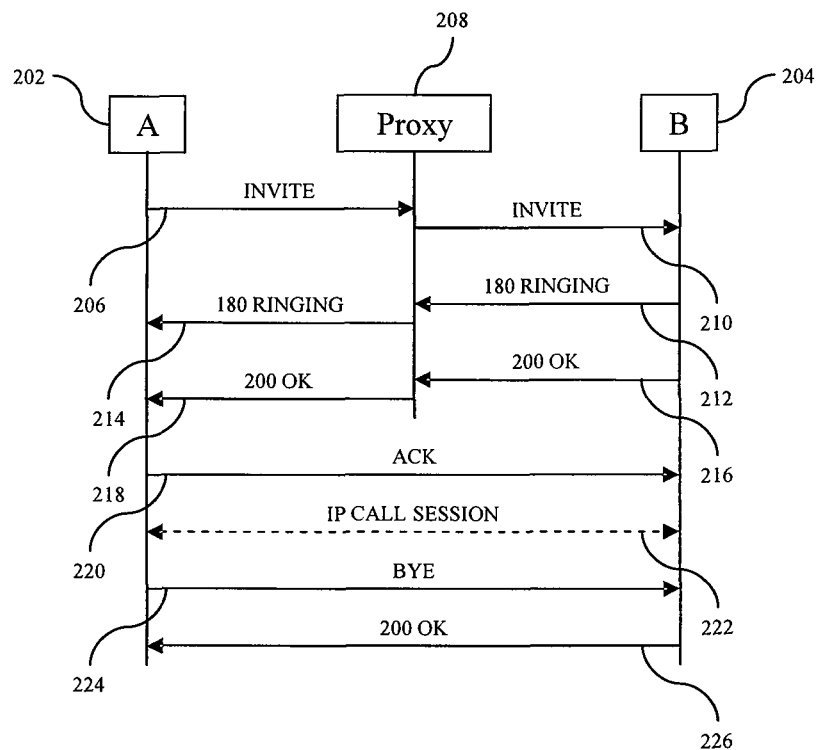
FIG. 2 shows an example of IP call management.

FIG. 2 shows an example 200 of managing an IP call session using a proxy. FIG. 2 shows messages that are exchanged between a calling party A 202 and a called party B 204. The calling party A 202 sends a Session Initiation Protocol (SIP) INVITE message 206 to a proxy server 208 within the IP network 200. The INVITE message 206 contains information that identifies the called party B 204 and indicates that the calling party A 202 wishes to participate in an IP call (such as a VoIP call) with the called party B 204. The SIP protocol is defined in RFC 3261 (originally in RFC 2543, now obsolete), which is incorporated herein by reference for all purposes. In other embodiments of the invention, other protocols to initiate an IP call session between the calling and called parties may be additionally or alternatively be used.

The IP address of the proxy server 208 may be known in advance. If not known, the IP address may be obtained, for example, using a DNS (domain name system) request to a DNS server (not shown) according to known methods.

The SIP INVITE message 206 may identify the called party B 204 using a SIP address of the called party B 204. For example, the called party B 204 may have a SIP address of "sip:colin@toadwillows.uk". However, the calling party A 202 may not know the current IP address of the called party B 204, especially if the called party B 204 has a dynamic IP address that changes over time. Therefore, one of the roles of the proxy server 208 is to look up the IP address associated with a SIP address, and forward the SIP INVITE message 206 to the called party B 204. Therefore, the proxy server 208 looks up the IP address of the called party B 204 (for example, by requesting the IP address from a location server, not shown, or using any other method) and forwards the INVITE message 206 as an INVITE message 210 to the called party B 204.

The called party B 204 returns a SIP 180 RINGING message 212 to the proxy server 208. The message 212 indicates that the called party B 204 has received the INVITE message 210, and is signaling to a user associated with the called party B 204 that an INVITE message has been received. For example, the called party B 204 may comprise a mobile telephone, and the user may be the owner of the mobile telephone. Alternatively, for example, the called party B 204 may be a software program that the user has logged into. The proxy server 208 forwards the 180 RINGING message 212 to the calling party A 202 as a 180 RINGING message 214.

If the called party 204 accepts the invitation to an IP call session, then the called party 204 sends a SIP 200 OK message 216 to the proxy server 208, which forwards the message to the calling party 202 as a 200 OK message 218. At this point, the calling party 202 and called party 206 each know each other's IP address, and the proxy server is no longer used for communications between the calling party 202 and called party 204 relating to the IP call session.

Therefore, the calling party 202 can send an ACK message 220 directly to the called party 204, without using the proxy server 208. The IP call session then proceeds between the calling party 202 and the called party 204 by the parties exchanging information 222 directly with each other, without using the proxy server 208. In embodiments of the invention, two parties exchanging messages and information directly with each other involves the parties exchanging information via the IP network 100 without explicitly using network elements such as the proxy server 108. However, it will be evident to one skilled in the art that exchange of messages and/or information between two parties using one or more IP networks as described herein, including "direct" exchanges, may include one or more proxy servers, gateways and/or other network elements in addition to those described according to the nature of the IP networks used.

The IP call session ends by one party sending a SIP BYE message to the other party, for example if one of the parties hangs up. As an example, FIG. 2 shows the calling party 202 sending a BYE message 224 directly to the called party 204. The called party 204 responds by sending a 200 OK message 226 to the calling party 202. The IP call session has now ended.

In the above example, it may be difficult to intercept the IP call session between the calling and called parties. For example, the proxy server 108 cannot be used to enable interception of the IP call as the proxy server 208 is not used once the call is set up using SIP messages. Therefore, the proxy server 208 cannot be used to intercept the information 222 exchanged during the IP call session.

Figure 3:
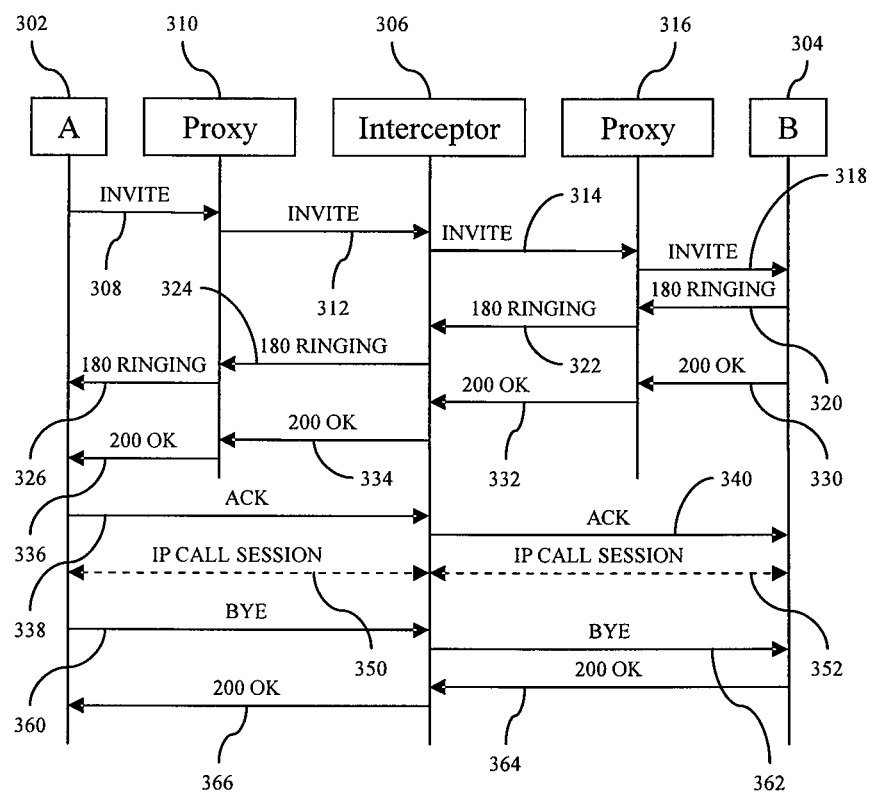
FIG. 3 shows another example of IP call management.

FIG. 3 shows an example 300 of managing an IP call session between a calling party A 302 and a called party B 304, where interception of the IP call session is enabled. Interception is enabled using an interceptor 306 that comprises, for example, a back-to-back user agent (B2BUA). The interceptor sets up two IP call sessions, one between the calling party and the interceptor, and the other between the interceptor and the called party. The interceptor receives all of the information sent by the calling party and the called party during the IP call session and enables exchange of this information between the parties by passing the information from one IP call session to the other. This situation is set up as follows.

The calling party A 302 first sends a SIP INVITE message 308 to a first proxy server 310. The first proxy server 310 identifies the IP address of the interceptor 306 as the destination for the INVITE message 308. Thus, the first proxy server 308 forwards the message as an INVITE message 312 to the interceptor 306.

The interceptor 306 terminates the INVITE message 312, i.e. does not forward it to the called party 304. Instead, the interceptor 306 generates a SIP INVITE message 314 for inviting the called party 304 to participate in an IP call session between the interceptor 306 and the called party 304, such that the interceptor 306 acts as the calling party in the IP call session. The INVITE message 314 is sent by the interceptor 306 to a second proxy server 316, which looks up the IP address of the called party 304 from the SIP address in the INVITE message 314. The second proxy server 316 forwards the INVITE message to the called party as INVITE message 318.

The called party 304 responds by sending a 180 RINGING message 320 to the second proxy server 316, which forwards the message to the interceptor 306 as a 180 RINGING message 322. The interceptor 306 then generates a 180 RINGING message 324 in response to the INVITE message 312 sent by the calling party 302 to the interceptor 306 via the first proxy server 308. The interceptor 306 sends the 180 RINGING message 324 to the first proxy server 310, which forwards the message to the calling party 302 as 180 RINGING message 326. Therefore, the calling party 302 knows that the called party has received the invitation to participate in an IP call session. However, the interceptor is acting as the called party from the point of view of the calling party 302.

When the called party 304 accepts the IP call session invitation, the called party 304 sends a SIP 200 OK message 330 to the second proxy server 316, which forwards the message as 200 OK message 332 to the interceptor 306. An IP call session has now been set up between the interceptor 306 and the called party 304, with the interceptor acting as a calling party 306 in this IP call session. The interceptor then generates a 200 OK message 334 and sends this message 334 to the first proxy server 310, which forwards the message as 200 OK message 336. An IP call session has now been set up between the calling party 302 and the interceptor 306, with the interceptor 306 acting as called party. The calling party 302 sends an ACK message 338 directly to the interceptor 306, and the interceptor 306 then sends an ACK message 340 directly to the called party 304.

The interceptor 306 then enables the calling party 302 and the called party to communicate as if they were participating in an IP call session directly with each other without the interceptor 306. Therefore, for example, where the calling party 302 sends IP call information 350 to the interceptor 306, the interceptor 306 forwards the information to the called party 304 as information 352. Similarly, for example, where the called party 304 sends IP call information 352 to the interceptor 306, the interceptor 306 forwards the information to the calling party 302 as information 350. As the IP call session information passes through the interceptor 306, the interceptor can record the IP call information if required. There will be a set of instructions for the interceptor to use for recording IP calls. As soon as the SIP INVITE arrives at the interceptor, the recording of the SIP communications begins, and then as soon as the IP call session packets begin they are recorded. The interceptor then saves copies of the communications and packets. They can be examined to reconstruct the information that is exchanged between the calling and called parties (for example, the speech that was exchanged). The interceptor may decide to record an IP call based on the set of instructions.

The IP call sessions end when one of the calling and called parties sends a SIP BYE message to the interceptor 306. The interceptor then generates another BYE message and sends it to the other party. For example, as shown in FIG. 3, the calling party sends a BYE message 360 to the interceptor 306. The interceptor 306 then generates a BYE message 362 and sends it to the called party 304. The called party responds by sending a 200 OK message 364 to the interceptor 306, which in turn generates another 200 OK message 366 to the calling party 302.

The interceptor, such as a B2BUA, may be a session border controller. A session border controller controls signaling and possibly media flows between IP networks—for example, between networks of different countries, between networks of different national operators, between operator and enterprise networks, and so on. A session border controller therefore enables communication between IP networks.

Figure 4:
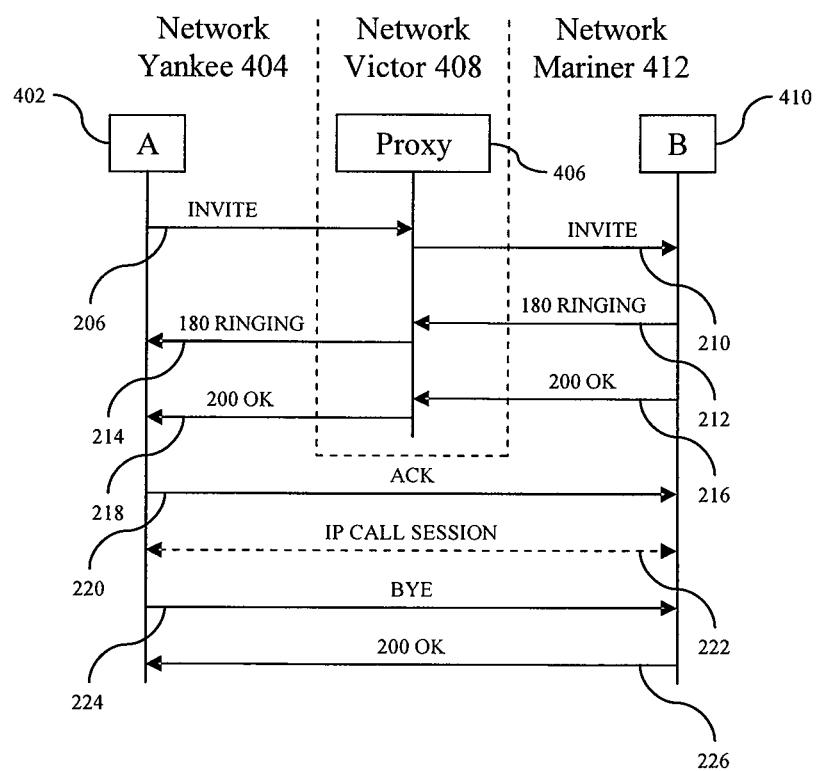
FIG. 4 shows an example of IP call management over at least three networks.

The above approach works where each party is in the same network as the proxy server with which it communicates. However, this approach for IP call intercept and recording is not suitable or practical in a scenario where the calling party, called party and proxy server are all on different networks. FIG. 4 shows such a scenario 400. As shown in FIG. 4, a calling party 402 connects, using a first network 404 named "Yankee", to a proxy server 406 in a second network 408 named "Victor". The called party 410 connects, using a third network 412 named "Mariner", to the proxy server 410 in the third network 412 named "Victor". This scenario may arise, for example, due to partnership agreements between the networks Victor 408 and Yankee 404, and between Victor 408 and Mariner 412. Thus, for example, the Victor network 408 may have a partnership agreement with the Yankee network 404 to connect a user (in this case, the calling party 402) to the Victor network 408 through the Yankee network 404. Similarly, the Victor network 408 may have a partnership agreement with the Mariner network 412 to connect a user (in this case, the called party 410) to the Victor network 408 through the Mariner network 412.

Communications 206-226 are shown in FIG. 4 for setting up and conducting an IP call session in a manner similar to that described above with reference to FIG. 2. Thus, for example, a SIP INVITE message 206 is sent by the calling party 402 in the Yankee network 404 to the proxy server 406 in the Victor network 408. There may be other proxy servers (not shown) used in the Mariner and Yankee networks.

The above described approach for IP call intercept and recording is not guaranteed to be suitable for the situation 400 shown in FIG. 4. This is because once the proxy server 406 in the Victor network 408 has served its purpose in setting up the IP call session set-up/establishment between the calling party 402 and the called party 410, subsequent exchange of information between the parties uses the networks Yankee 404 and Mariner 412 connected directly. For example, the information exchanged in the IP call session 222 shown in FIG. 4 is exchanged using the networks Yankee 404 and Mariner 412. Therefore, any information exchanged does not use the Victor network 408. However, as one or both of the parties may be associated with the Victor network 408 (for example, as a subscriber to services provided or enabled by the Victor network 408), the Victor network 408 may be required to allow or enable interception of IP calls. This is not possible in the situation 400 shown in FIG. 4, as the conversation information 222 to be recorded does not pass through the Victor network 408.

As shown in FIG. 4, there are no proxy servers between the networks Yankee 404 and Victor 408, or between the networks Mariner 412 and Victor 408. However, there may be proxy servers (not shown) within the networks Yankee 404 and Victor 412 that serve purposes similar to those of the proxy servers shown in FIGS. 2 and 3.

Figure 5:
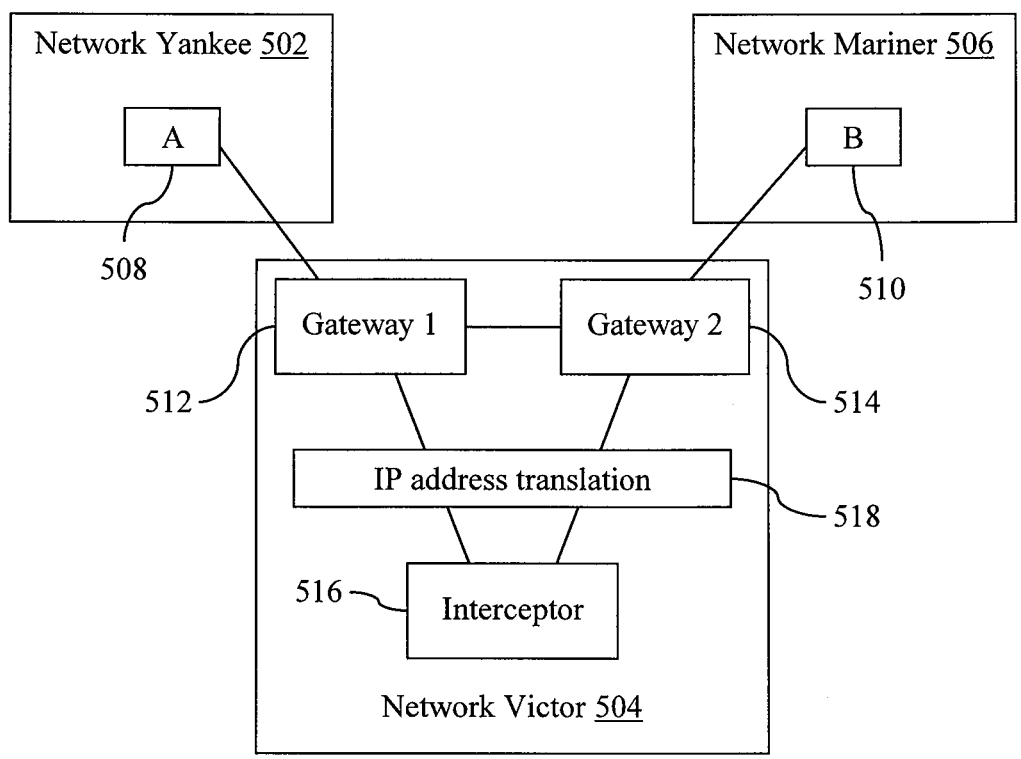
FIG. 5 shows a system for managing an IP call according to embodiments of the invention.

FIG. 5 shows an example of a system 500 for managing an IP call according to embodiments of the invention. The system 500 includes a Yankee network 502, Victor network 504 and Mariner network 506. A first party A 508 connects to the Victor network 504 through the Yankee network 502. A second party B 510 connects to the Victor network 504 though the Mariner network 506.

The Victor network 504 comprises a first gateway 512 and a second gateway 514. The gateways act as nodes through which communications between networks may pass. For example, communications between the networks Yankee 502 and Victor 504 pass through the first gateway 512, and communications between the networks Mariner 506 and Victor 504 pass through the second gateway 514. Communications (such as IP call information, and other types of information and communications) from the Yankee network 502 to the Mariner network 506, or vice versa, may pass through both gateways 512 and 514 without passing through other network elements in the Victor network 504 if the communications are not to be intercepted. For example, if a communication from the Yankee network 502 intended for the Mariner network 506 is not to be intercepted, the first gateway 512 forwards the communication to the second gateway 514, which then forwards the communication to the Mariner network 506. It may alternatively be possible for the first gateway 512 to forward communications directly to the Mariner network 506 without using the second gateway 514.

If a communication is to be intercepted, a gateway in the Victor network 504 forwards the communication to an interceptor 516 instead of the other gateway. For example, a communication from the Yankee network to be intercepted is forwarded by the first gateway 512 to the interceptor 516 instead of the second gateway 514. The interceptor 516 may then act as a back-to-back user agent (B2BUA) between parties in the networks Yankee 502 and Mariner 506 via the appropriate gateways 512 and 514.

The Victor network 504 may optionally employ IP address translation 518 within the network. The IP address translation 518 ensures that when the interceptor 516 is acting as a B2BUA between two parties, the IP address of the B2BUA may be IP addresses that are expected by the parties. For example, from the point of view of a calling party, the IP address translation 518 ensures that the IP address of the called party, in this case the B2BUA, is an IP address that is reasonably expected by the calling party. Similarly, from the point of view of a called party, the IP address translation 518 ensures that the IP address of the calling party, in this case the B2BUA, is an IP address that is reasonably expected by the called party. In certain embodiments of the invention, the IP address translation 518 may be arranged such that the IP address of the interceptor 516 from the point of view of each of the parties is the current IP address of the other party. Thus, for example, from the point of view of the called party, the IP address of the interceptor 516 is the IP address of the calling party. Optionally, a proxy may be placed between the address translator and the interceptor to minimize the traffic on the interceptor and to further shield against its discovery.

The system 500 may be configured to intercept and record an IP call that meets certain criteria. The configuration is done by, for example, the owner of the network to be configured (for example, by the Victor network 504). A third party, for example a government agency, may request the Victor network 504 to, for example, intercept and a record an IP call meeting the criteria that a certain SIP address is the calling or called party. The Victor network is thus reconfigured to enable intercepting of the appropriate IP calls. To do this, the gateways 512 and 514 are reconfigured to direct appropriate traffic to the interceptor 516 instead of the other gateway. Furthermore, the routing table of the gateways may be copied from the gateways to the interceptor 516 so that the interceptor can route communications it generates appropriately when it receives communications from the calling or called party.

One or both of the gateways 512 and 514 may be configured to redirect appropriate communications accordingly.

Figure 6:
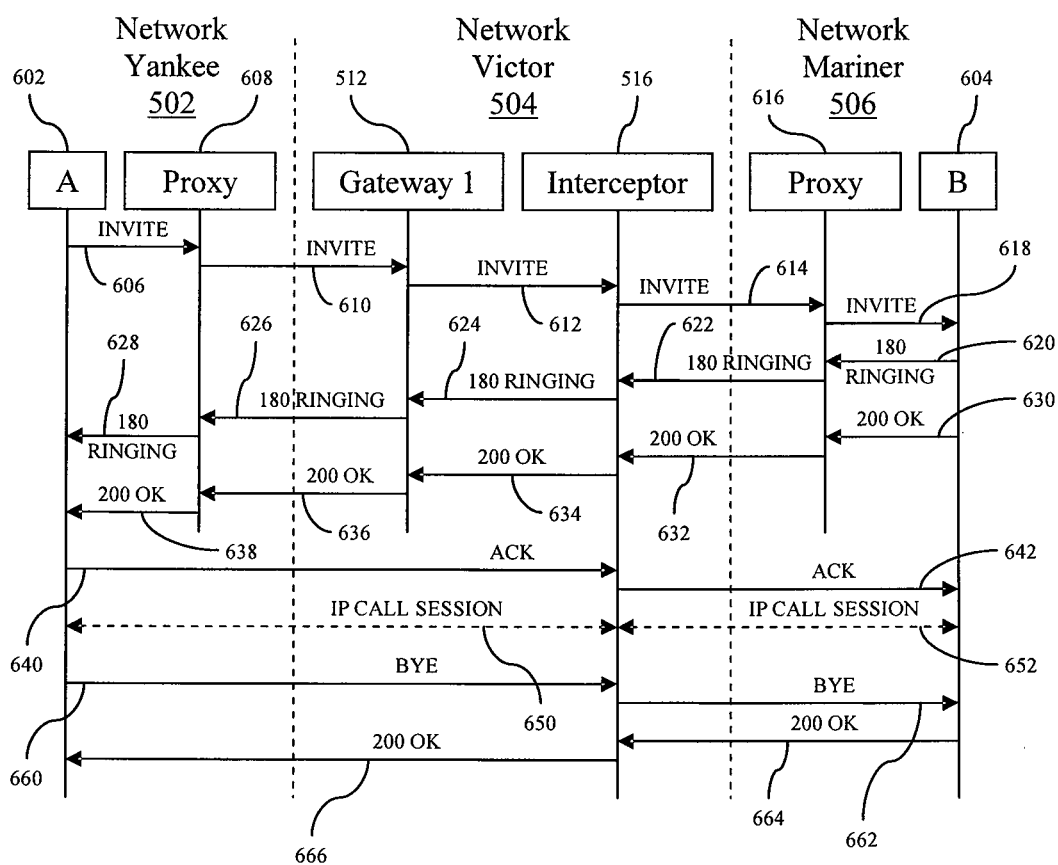
FIG. 6 shows an example of managing an IP call according to embodiments of the invention.

FIG. 6 shows an example 600 of managing an IP call between a calling party 602 and a called party 604 according to embodiments of the invention. Services are provided or enabled for the calling party 602 and/or the called party 604 by the Victor network 504. The calling party 602 connects to the Victor network 504 through the Yankee network 502. Similarly, the called party 604 connects to the Victor network 504 through the Mariner network 506. The second gateway 514 and the IP address translation 518 of the system 500 shown in FIG. 5 are not shown for clarity. The second gateway 514 simply forwards communications between the networks Victor 504 and Mariner 506.

To set up an IP call session between the calling party 602 and the called party 604, the calling party 602 sends a SIP INVITE message 606 to a proxy server 608 in the Yankee network 502. The proxy server 608 determines an IP address of the first gateway 512 in the Victor network 504 (for example, from a lookup server, not shown) and forwards the INVITE message 606 to the gateway as an INVITE message 610.

When the gateway receives the INVITE message 610, it determines whether the IP call that the INVITE message 610 relates to should be intercepted. For example, the IP call is intercepted if the calling or called party has a certain SIP address. If the IP call should not be intercepted, then the gateway forwards the INVITE message to the called party 604 in the Mariner network 506 (possibly via the second gateway 514, not shown in FIG. 5). However, if the IP call should be intercepted, the gateway 512 will already have been configured to cause all traffic related to the IP call (for example, SIP traffic to set up or end the IP call session, and information exchanged during the IP call session) to be redirected to the interceptor 516. The first gateway 512 then forwards the SIP INVITE message 610 to the interceptor 516 as INVITE message 612.

The interceptor 516 then configures itself as a B2BUA between the calling party 602 and the called party 604 as follows. The interceptor 516 terminates the INVITE message 612, that is, the interceptor 516 does not forward the INVITE message 612 to the called party 604. Instead, the interceptor 516 creates an INVITE message 614 and sends the message 614 to a proxy server 616 in the Mariner network 506, such that the interceptor 516 invites the called party 604 to an IP call session where the interceptor 516 acts as the calling party. The proxy server 616 determines the IP address of the called party 604 (for example, using a lookup server, not shown) and forwards the INVITE message 614 to the called party 604 as an INVITE message 618.

In response, the called party 604 sends a 180 RINGING SIP message 620 to the proxy server 616, which forwards the message 620 to the interceptor 516 as a 180 RINGING message 622. When the interceptor 516 has received the message 622, the interceptor creates a 180 RINGING message 624 and sends it to the first gateway 512. The first gateway forwards the message 624 to the proxy server 608 in the Yankee network 502 as 180 RINGING message 626, and the proxy server 608 forwards the message 626 to the calling party 602 as 180 RINGING message 628. Thus, the interceptor 516 responds to the calling party 602 in such a manner that when the interceptor 516 accepts the INVITE message 612 with a 200 OK message, the interceptor 516 will act as called party in an IP call session with the calling party 602.

The called party 604 responds to the INVITE message 618 with a 200 OK message 630 sent to the proxy server 616, which forwards the message 630 to the interceptor 516 as a 200 OK message 632. The interceptor 516 is now in an IP call session with the called party 604, with the interceptor 516 acting as the calling party. The interceptor 516 then accepts the INVITE message 612 by sending a 200 OK message 634 to the gateway 512, which forwards the message 634 to the proxy server 608 in the Yankee network 502 as a 200 OK message 636. The proxy server 608 then forwards the message 636 to the calling party 602 as 200 OK message 638. The interceptor 516 is now in an IP call session with the calling party 602, with the interceptor 516 acting as calling party.

The calling party 602 sends an ACK message 640 to the interceptor 516, which sends an ACK message 642 to the called party 604. Subsequently, information is exchanged between the calling party 602 and the called party 604 with the interceptor 516 as a back-to-back user agent (B2BUA) between the parties. Thus, for example, the calling party 602 may send information to the interceptor 516 in IP call session 650, and the interceptor 516 forwards this information to the called party 604 in IP call session 652. Additionally or alternatively, the called party 604 may send information to the interceptor 516 in IP call session 652, and the interceptor 516 forwards this information to the calling party 602 in IP call session 650.

Thus, the information exchanged between the calling party 602 and the called party 604 passes through the interceptor 516. The Victor network (for example, the gateway 512 within the Victor network) provides IP call management such that the IP calls to intercept can be determined, and the intercept of such calls is enabled.

In certain embodiments of the invention, the interceptor 516 operates as a B2BUA in a manner that is transparent or barely noticeable to the parties. This may be achieved in one or more of a number of ways. For example, the IP address translation 518 shown in FIG. 5 may be used to present an expected IP address to one or both of the calling party 602 and the called party 604. Additionally or alternatively, the interceptor 516 may be provisioned with sufficient hardware and/or software capability such that the delay to, or latency of, communications between the calling party 602 and the called party 604 is minimized, barely noticeable, negligible and/or sufficiently small to be comparable to normal delays or latencies within IP networks.

To terminate the call, the calling party 602 or the called party 604 hangs up. For example, as shown in FIG. 6, the calling party 602 hangs up by sending a SIP BYE message 660 to the interceptor 516. The interceptor 516 then sends a BYE message to the called party 604. The called party 604 responds by sending a 200 OK message 664 to the interceptor 516, which sends a 200 OK message 666 to the called party 602. The two IP call sessions 650, 652 in which the interceptor 516 was participating as B2BUA are thus ended.

As the information and messages exchanged between the calling party 602 and the called party 604 passes through the interceptor 516, the interceptor 516 may, for example, record the messages and/or information, and/or may alter the information as desired. For example, the interceptor may provide other services where the information is altered to allow, for example, music injection, on-demand recording, multi-party IP call sessions (i.e. call sessions involving three or more parties), and other services.

The interceptor 516 is shown in FIG. 5 to be within the Victor network 504. However, in alternative embodiments of the invention, the interceptor 516 may be located outside of the Victor network 504. For example, the interceptor 516 may be located in a specific country and therefore the interceptor will fall in the legal jurisdiction of the country that is requesting interception of an IP call.

The calling party and the called party in an IP call may use security to prevent eavesdropping by third parties. For example, the information exchanged between the calling party and a called party, where a B2BUA is not involved, may be encrypted so that a third party that has access to the encrypted information cannot decrypt the information. Where a B2BUA is involved, such as in FIGS. 5 and 6, the calling party would expect to set up a secure connection with the called party when setting up an IP call. However, instead the calling party is misled to set up a secure connection with the interceptor, as the interceptor accepts the secure session request and responds to the calling party as appropriate. The interceptor may then also set up a secure session with the called party. Thus, for example, the IP call sessions 650 and 652 shown in FIG. 6 are secure sessions, and it appears to both the calling party and the called party that they are communicating with each other over a secure connection. Examples of security that may be used between two parties or a party and the interceptor 516 include, for example, IPsec.

In some circumstances, security between the calling and called parties may be such that the above approach of setting up two secure sessions may not be suitable. For example, security may be pre-arranged between the parties. In such cases, the interceptor may forward the secure information and/or messages between the parties, but would not be able to decrypt the messages and/or information. However, the interceptor may nevertheless record such information and/or messages, for example for later analysis. In alternative embodiments, the interceptor or the Victor network may be configured so as to disallow IP calls where the security is pre-arranged between the parties.

In embodiments of the invention, the interceptor may be implemented as, for example, a HP OpenCall Media Platform. Alternatively, the interceptor may be implemented, for example, using OpenSER, which is open-source SIP server software that includes a software module "siptrace" that allows SIP traffic to be recorded when passing through the server. A software product such as HP OpenView Service Manager may be used to configure a network according to embodiments of the invention using a pre-programmed model of a typical intercepted IP call. For example, HP OpenView Service Manager may be used to configure one or more gateways to ensure certain IP calls are intercepted.

It will be appreciated that embodiments of the present invention can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

What is claimed is:

1. A method of managing an IP call between a calling party and a called party, the method comprising:
    receiving, at an interceptor, a first request to set up the call forwarded from the calling party through a gateway;
    terminating the first request at the interceptor;
    generating a second request at the interceptor to set up a call between the interceptor and the called party;
    setting up a first IP call session between the interceptor and the called party in response to the second request;
    setting up a second IP call session between the interceptor and the calling party in response to the first request;
    operating the interceptor to forward information received from the called party during the first IP call session to the calling party through the second IP call session, and to forward information received from the calling party during the second IP call session to the called party through the first IP call session; and
    operating the interceptor to record SIP communications and IP call session packets received from the first IP call session, and to record SIP communications and IP call session packets received from the second IP call session.

2. The method as claimed in claim 1, further comprising using IP address translation to translate the IP address of the interceptor.

3. The method as claimed in claim 2, comprising using IP address translation such that the IP address of the interceptor appears to the calling party to be the IP address of the called party.

4. The method as claimed in claim 2, comprising using IP address translation such that the IP address of the interceptor appears to the called party to be the IP address of the calling party.

5. The method as claimed in claim 1, wherein setting up the first IP call session between the interceptor and the called party comprises setting up a secure IP call session.

6. The method as claimed in claim 1, wherein setting up the second IP call session between the interceptor and the calling party comprises setting up a secure IP call session.

7. The method as claimed in claim 1, comprising:
    receiving a request to intercept IP calls that meet criteria; and
    configuring the gateway to route IP calls meeting the criteria through the interceptor;
    and wherein determining a requirement to route the call through the interceptor comprises determining whether the call meets the criteria.

8. The method as claimed in claim 1, comprising operating the interceptor as a back-to-back user agent (B2BUA) between the calling party and the called party.

9. An IP network for managing an IP call between a calling party and a called party, the IP network comprising a gateway and an interceptor, wherein the IP network is arranged to:
    receive, at the gateway, a first request to set up the call from the calling party;
    determine, from the first request, a requirement to route the call through the interceptor;
    forward the first request from the gateway to the interceptor and terminate the first request at the interceptor;
    generate a second request at the interceptor to set up a call between the interceptor and the called party;
    set up a first IP call session between the interceptor and the called party in response to the second request;
    set up a second IP call session between the interceptor and the calling party in response to the first request;
    operate the interceptor to forward information received from the called party during the first IP call session to the calling party through the second IP call session, and to forward information received from the calling party during the second IP call session to the called party through the first IP call session; and
    operate the interceptor to record SIP communications and IP call session packets received from the first IP call session, and to record SIP communications and IP call session packets received from the second IP call session.

10. The IP network as claimed in claim 9, further arranged to use IP address translation to translate the IP address of the interceptor.

11. The IP network as claimed in claim 10, arranged to use IP address translation such that the IP address of the interceptor appears to the calling party to be the IP address of the called party.

12. The IP network as claimed in claim 10, arranged to use IP address translation such that the IP address of the interceptor appears to the called party to be the IP address of the calling party.

13. The IP network as claimed in claim 9, arranged to set up the first IP call session between the interceptor and the called party by setting up a secure IP call session.

14. The IP network as claimed in claim 9, arranged to set up the second IP call session between the interceptor and the calling party by setting up a secure IP call session.

15. The IP network as claimed in claim 9, arranged to:
   receive a request to intercept IP calls that meet criteria; and
   configure the gateway to route IP calls meeting the criteria through the interceptor;
   and further arranged to determine a requirement to route the call through the interceptor by determining whether the call meets the criteria.

16. The IP network as claimed in claim 9, comprising operating the interceptor as a back-to-back user agent (B2BUA) between the calling party and the called party.

17. A non-transitory storage media comprising computer readable instructions for causing a data processing system to implement the method of claim 1.

18. A data processing system having loaded therein the computer program as claimed in claim 17.

\* \* \* \* \*